(12) United States Patent
Walters et al.

(10) Patent No.: US 11,814,980 B2
(45) Date of Patent: Nov. 14, 2023

(54) BLADED DISC

(71) Applicant: ROLLS-ROYCE plc, London (GB)

(72) Inventors: Sean A Walters, Bristol (GB); John Irving, Derby (GB); Nomesh P Kandaswamy, Bangalore (IN); Jessica Kennedy, Derby (GB); Benjamin Littley, Derby (GB); Kali Charan Nayak, Bangalore (IN); Guy D Snowsill, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/966,285

(22) Filed: Oct. 14, 2022

(65) Prior Publication Data

US 2023/0122071 A1  Apr. 20, 2023

(30) Foreign Application Priority Data

Oct. 15, 2021  (GB) ...................................... 2114773

(51) Int. Cl.
*F01D 5/06* (2006.01)
*F01D 5/30* (2006.01)

(52) U.S. Cl.
CPC ............... *F01D 5/06* (2013.01); *F01D 5/30* (2013.01); *F05D 2220/323* (2013.01); *F05D 2250/71* (2013.01)

(58) Field of Classification Search
CPC ............ F01D 5/06; F01D 5/30; F01D 11/001
See application file for complete search history.

(56) References Cited

U.S. PATENT DOCUMENTS 4,692,976 A  9/1987 Andrews
4,940,389 A  7/1990 Luxenburger
(Continued)

FOREIGN PATENT DOCUMENTS

CN  102227545 A  10/2011
EP  1 617 045 A1  1/2006
(Continued)

OTHER PUBLICATIONS

Mar. 18, 2022 Search Report issued in British Patent Application No. 2114773.1.
(Continued)

*Primary Examiner* — Sabbir Hasan
(74) *Attorney, Agent, or Firm* — Oliff PLC

(57) ABSTRACT

A bladed disc system for a turbine engine having a disk portion and a plurality of blade portions which are associated with a stator section and an intercavity sealing portion, disc portion shaped such that blade portions are able to fit within firtree slot in disc portion, blade portion having aerofoil section and root section, aerofoil section having portion shaped such that they extend proximate to intercavity sealing portion, disc portion extending from portion that connects with drum to outer edge at which blade portions are connected with disc portion having width transition region in which thickness of disc increases from point at which disc connects to drum to outer edge at which it holds blade portions, and wherein width transition region has curved width transition region with radius r, and an overhanging portion which extends into the intercavity spacing between the width transition region and the intercavity sealing portion.

11 Claims, 12 Drawing Sheets

(56) References Cited

U.S. PATENT DOCUMENTS

| | | | |
|---|---|---|---|
| 5,183,389 A | 2/1993 | Gilchrist et al. | |
| 9,039,382 B2 * | 5/2015 | Stapleton | F01D 5/30 416/193 A |
| 10,196,895 B2 * | 2/2019 | Weinert | F01D 5/081 |
| 10,907,482 B2 | 2/2021 | Snyder et al. | |
| 2003/0200741 A1 | 10/2003 | Moniz et al. | |
| 2006/0045741 A1 | 3/2006 | Honkomp | |
| 2007/0292271 A1 | 12/2007 | Bil et al. | |
| 2013/0136618 A1 | 5/2013 | Stapleton | |
| 2017/0022818 A1 | 1/2017 | Weinert et al. | |
| 2017/0218778 A1 | 8/2017 | Trappier et al. | |
| 2018/0313367 A1 | 11/2018 | Drevs et al. | |

FOREIGN PATENT DOCUMENTS

| | | | | |
|---|---|---|---|---|
| EP | 1 772 592 A2 | 4/2007 | | |
| EP | 1 772 592 A3 | 12/2010 | | |
| EP | 2 540 968 A2 | 1/2013 | | |
| EP | 2 599 966 A2 | 6/2013 | | |
| EP | 2 540 968 A3 | 7/2013 | | |
| EP | 2 599 966 A3 | 6/2014 | | |
| EP | 2037081 B1 * | 12/2016 | | F01D 25/12 |
| EP | 3 670 837 A1 | 6/2020 | | |

OTHER PUBLICATIONS

Mar. 21, 2022 Search Report issued in British Patent Application No. 2114772.3.

U.S. Appl. No. 17/966,330, filed Oct. 14, 2022 in the name of Guy D Snowsill et al.

Mar. 15, 2023 Search Report issued in European Patent Application No. 22200768.4.

Jul. 28, 2023 Office Action issued in U.S. Appl. No. 17/966,330.

* cited by examiner

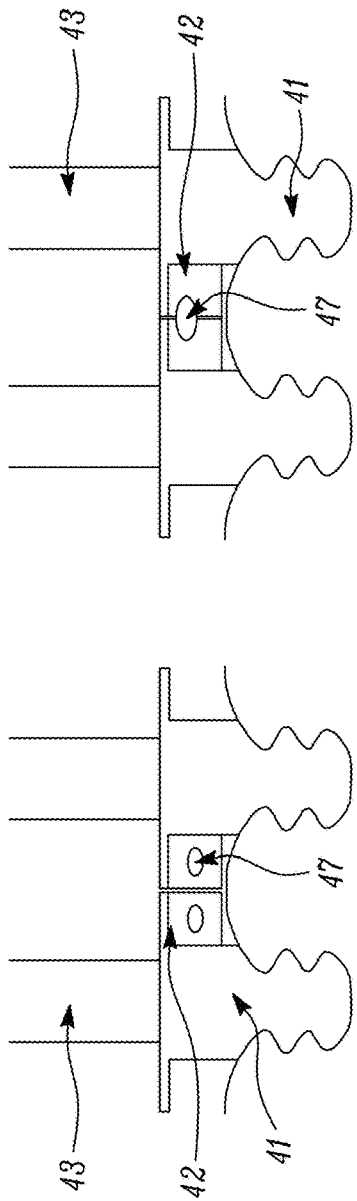
FIG. 7A
FIG. 7B
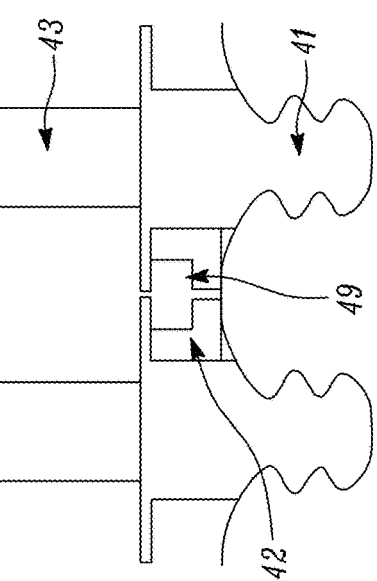
FIG. 7E
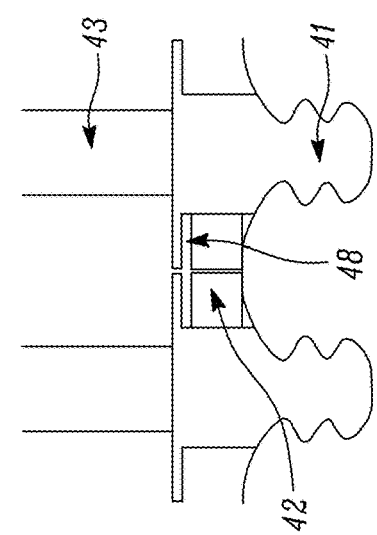
FIG. 7D
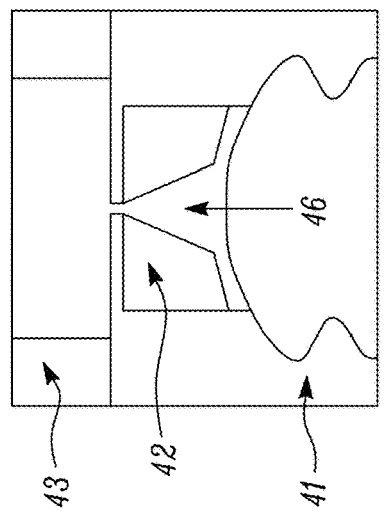
FIG. 7C

BLADED DISC

This specification is based upon and claims the benefit of priority from UK Patent Application Number 2114773.1 filed on 15 Oct. 2021, the entire contents of which are incorporated herein by reference.

BACKGROUND

Overview of the Disclosure

The disclosure relates to profiling the hub of the disc of a turbine blade in a gas turbine engine. The disclosure also relates to profiling a skirt in order to capture sulfidation particles instead of the blade.

BACKGROUND OF THE DISCLOSURE

Sulfidation is an issue for all turbine engines. Sulfidation affects the shroud, the blade root and can affect the blade itself. Sulfidation is the result of a reaction between the metal or alloy, of which the component is made, and sulphur; this reaction produces a sulphur compound that forms on or under the surface of a metal or alloy and results in corrosion to the surface of the component. In the case of a gas turbine engine, sulphur is present in the fuel as well as being ingested into the engine from salt compounds in the air. Both of these sources of sulphur can then form sulphur compounds during the combustion process—for example; the reaction of these initial sulphates in the heat of the engine with other compounds present may create sodium sulphates. Sodium sulphates cause the protective oxide layer around the turbine blade to decay. Furthermore, water can also be produced as a by-product of the combustion process, which if able to combine with the sodium sulphur compounds forms sulphuric acid that can corrode the components. The effect of both the sulphur compound particles and the sulphuric acid leads to corrosion of the blade. This corrosion is a particular issue in areas around the shroud where the airflow is constricted and so these compounds can accumulate.

The effect of sulfidation is corrosion of the blade. This is particularly problematic at the root of the blade where the metal/alloy forming the blade is thinner. Corrosion of this area causes weakening and can lead to a catastrophic failure of the blade. As such monitoring of the blades is required to look for signs of sulfidation, as the presence of sulfidation could affect the lifetime of a blade. If detected the blade can then be cleaned or replaced depending upon the level of damage. Cleaning can also be carried out through immersion in acid, abrasive blast cleaning or acidic descale process. However, the monitoring and the cleaning is an intensive time-consuming process. As such there is a need to reduce the affect and the accumulation of sulphur deposits on the blades of the turbines within the engine. Consequently, there is a need to provide a means of reducing the accumulation of a particles, in particular sulphur particles, on the turbine blades.

SUMMARY OF THE DISCLOSURE

According to a first aspect of the disclosure there is provided a bladed disc system for a turbine engine comprising a disk portion and a plurality of blade portions which are associated with a stator section and an intercavity sealing portion, the disc portion being shaped such that the blade portions are able to fit within firtree slot in the disc portion, the blade portion comprising an aerofoil section and a root section, the aerofoil section having a portion shaped such that they extend proximate to the intercavity sealing portion, the disc portion extending from a portion that connects with a drum to the outer edge at which the blade portions are connected with the disc portion having a width transition region in which the thickness of the disc increases from the point at which the disc connects to the drum to an outer edge at which it holds the blade portions, and wherein the width transition region has a curved width transition region with a radius r, and an overhanging portion which extends into the intercavity spacing between the width transition region and the intercavity sealing portion.

The overhanging portion may also feature a protrusion that extends towards a centre of the disc portion. 3. The protrusion may extend between 0.01 and 3.5 mm from the overhang portion. The protrusion may be "L" shaped or has a square cross-sectional profile.

The radius of curvature r of the width transition region may have a ratio with the width of the disc at the start of the curvature w before the transition region with the value of the ratio r/w being between 0.35 and 1.1. In particular, the ratio r/w may be between 0.65-0.85.

The overhanging portion may extend between 10%-50% of the space between the transition region and the seal arrangement.

The root section comprises a fir tree profile and a skirt portion and wherein the skirt portions of adjacent blades may form an opening that has a maximum separation of between 1-50% of the maximum skirt opening width. The skirt portion of adjacent blades may form a rectangular opening, such that the opening between the adjacent blades has parallel edges. The skirt portion of adjacent blades may form a triangular opening, such that the skirts of adjacent blades taper to the maximum separation. The rear of the skirt portion may be fileted or has zero hade angle. The rear of the skirt portion may have a hole.

According to a second aspect of the invention there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein the turbine section has a bladed disc having a profiled shape as described above.

The turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds), for example in the range of from 1800 K to 1950 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE FIGURES

Embodiments will now be described by way of example only, with reference to the Figures, in which:

FIG. 7a-7e presents examples of the air passageway between the skirts of adjacent turbine blades;

DETAILED DESCRIPTION OF THE DISCLOSURE

Figure 1:
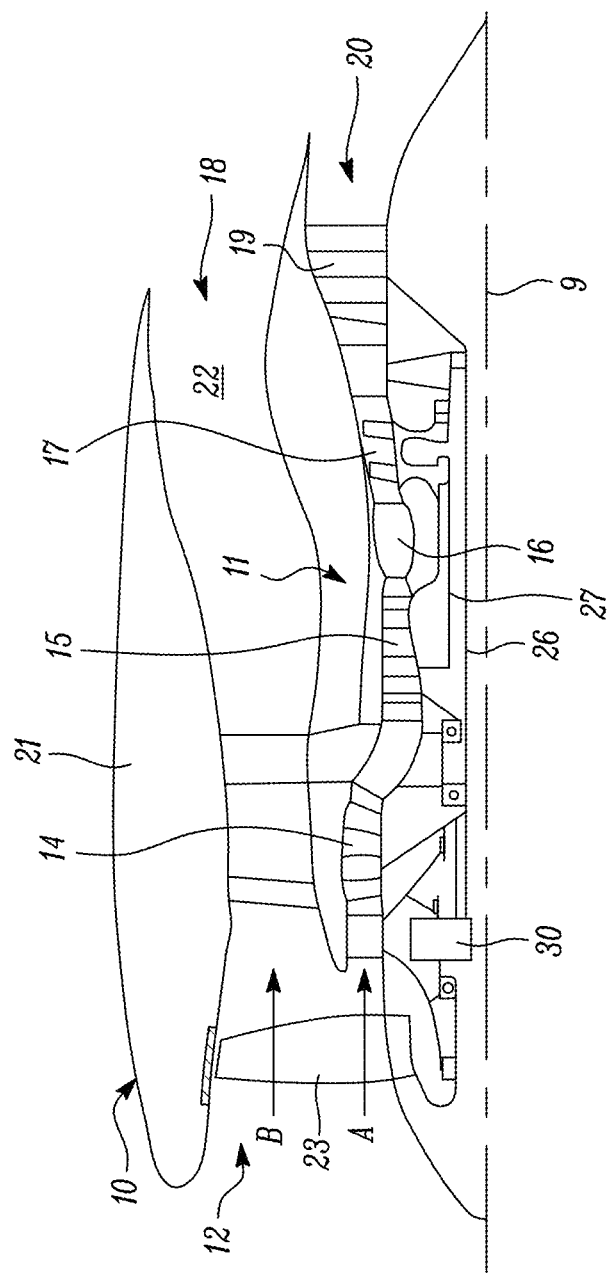
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
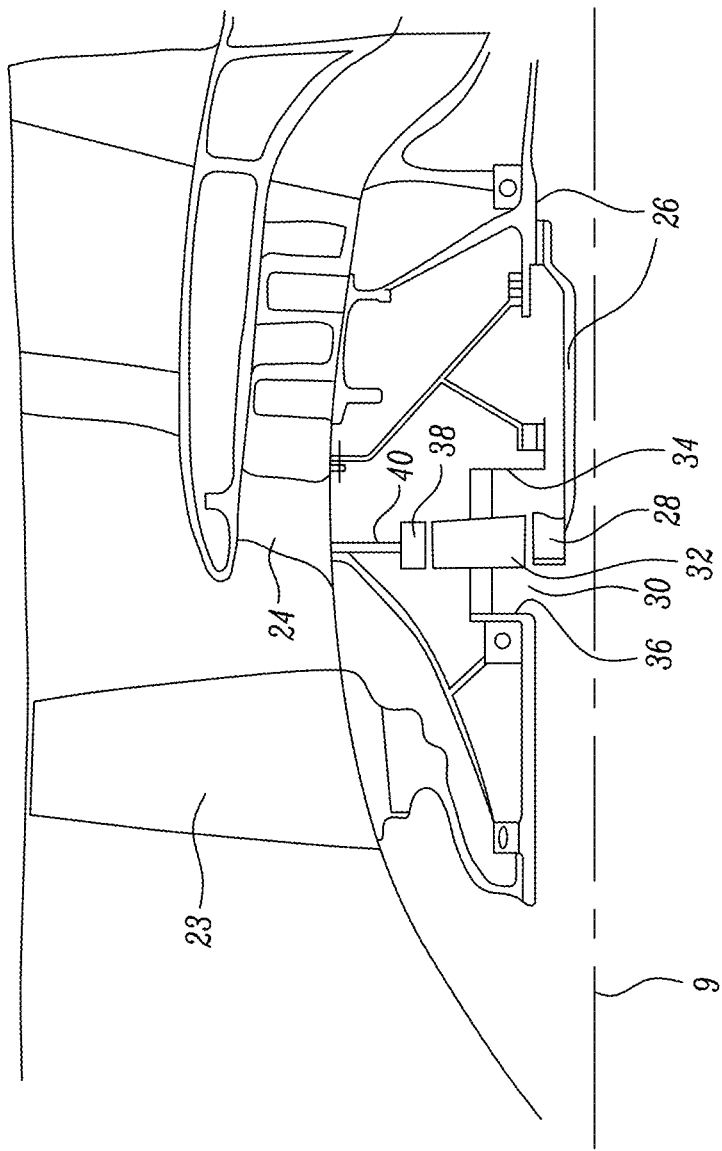
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
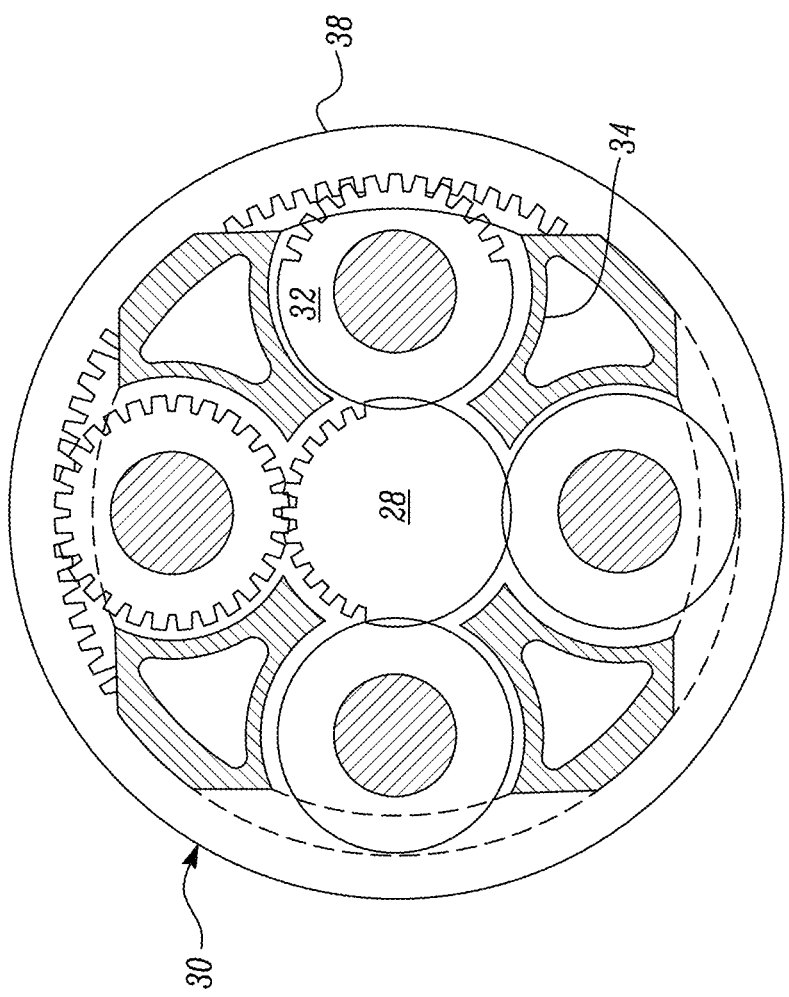
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As discussed above, within a gas turbine engine there are a number of compressor stages as well as a number of turbine stages. These turbine stages are typically referred to as high pressure turbine, intermediate pressure turbine and low-pressure turbine with the high-pressure turbine being located closest to the combustor of the turbine engine. As such, the high-pressure turbine experiences higher temperature operating conditions than the those of the intermediate pressure turbines and the low-pressure turbine. Each turbine stage comprises a bladed disc. The disc extends from a central axis radially outwards. Towards the radially outer edge of the blade the disc widens to accommodate the blades. Within this wider portion of the disc it is provided with a number of slots. These slots are provided with a fir tree profile that corresponds with the fir tree shape of the root of the blade, such that when the is fitted onto the disk it is securely held. Further securing is achieved through the use of lock plates, which prevent the blade from sliding off the disc. The blades themselves comprise a root having a fir tree profile as discussed which engages with the disc.

Figure 4:
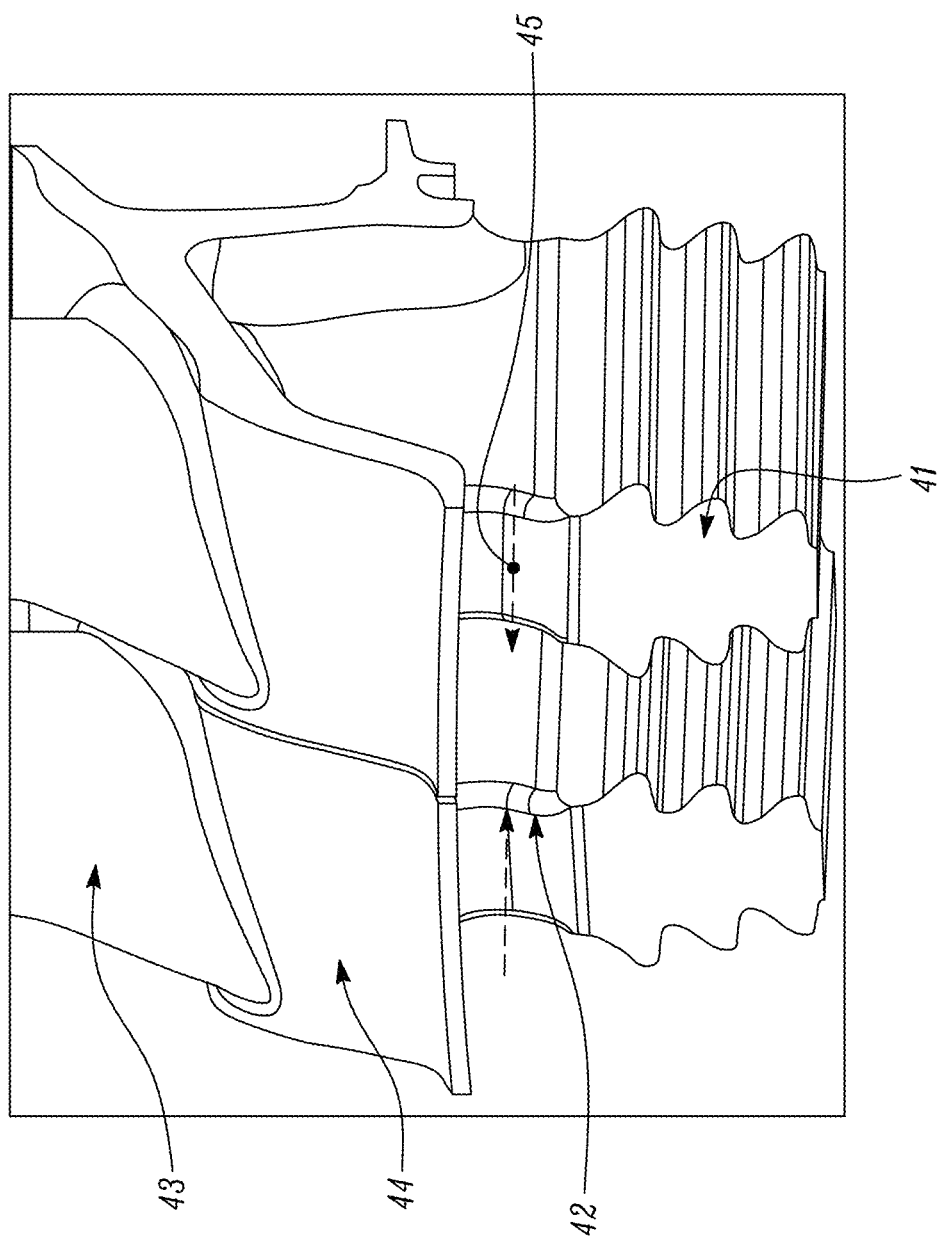
FIG. 4 is a prior art example of a pair of adjacent turbine blades.

FIG. 4 shows a prior art version of adjacent turbine blades. Above the root section 41 there is a skirt portion 42 which interacts with a seal to prevent the leakage between the blades 43. Connected to the skirt portion is a shroud 44 which works with a seal on the stator to prevent cooling flow losses. Above the shroud is the turbine blade portion which interacts with the air that has been heated during the combustion process. The skirt portion of neighbouring discs in the prior art are spaced apart from each other and extend vertically from the root portion to the blade ring; this presents a maximum opening width 45. The edge portion of the skirt is also bevelled. Above the blade ring, or radially outward, the blade lies and fits within the housing. The disc as shown in FIG. 1 is mounted to a shaft that is coupled to a compressor stage, such that rotation of the turbine disc results in rotation of the compressor stage. Energy is imparted to the turbine disc from the combustion of the fuel in the combustor. This energy transfer occurs by the expansion of the air from the compressor when it is combusted in the combustion chamber. This air is accelerated by the shape of the combustion chamber. The flow of hot air impacts with the blades and causes them to rotate. However, along with the hot air that is carried there are also the heated byproducts of the combustion chamber. These compounds can result in sulfidation damage to the blade and or the disc that holds the turbine blades.

Figure 5B:
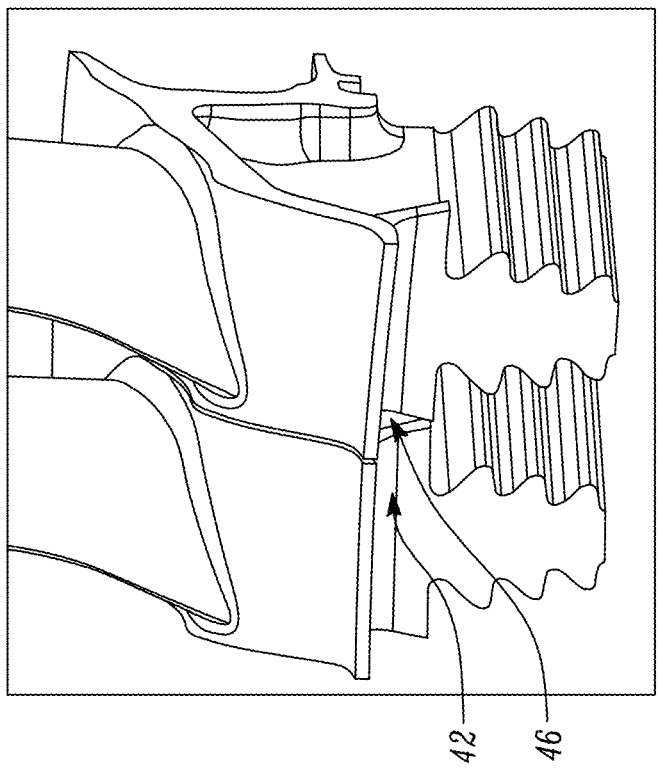
FIG. 5b presents an alternative example of the skirt design according to the present disclosure.
Figure 5A:
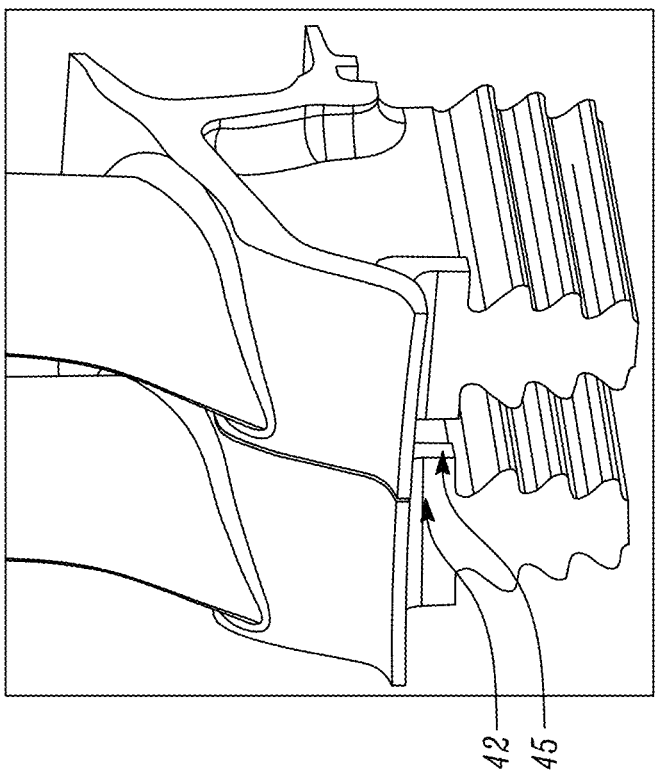
FIG. 5a is an example of the turbine blade having a skirt of the present disclosure.

FIG. 5a presents a schematic of a pair of adjacent turbine blades according to the present disclosure. In these figures it can be seen that the skirt 42 has been widened so that it extends across a portion where the disc would be in use. The widening of the skirt has reduced the distance between the skirts. The skirts are shaped to form a rectangular opening 45 between the skirt portions of the adjacent blades. In FIG. 5a the skirt extends to ~39% of the maximum skirt opening width. In a prior art example the size of the maximum opening width (the prior art opening width) is 11.9 mm; this spacing extends between the edges of the skirts as presented in the example in FIG. 4a. The spacing between the skirts in FIG. 5a is 4.6 mm. The relative sizes of the spacings can be varied with the size of the system, however it is the percentage of the maximum opening width that is key. FIG. 5b shows another plan view of a turbine blade according to the present disclosure. In this the skirt 42 again extends across a portion where the disc would be in use. The skirt then tapers away from the root of the blade to the blade portion of the blade, such that a triangular opening 46 is present between the adjacent blades. The skirt may extend to between 1-50% of the maximum opening width. The maximum opening width being the design case presented in FIG. 4 in which the skirts extend vertically form the firtree root connection with the disc. Preferably the skirt may extend between 1% to 20% of the opening width. It has been found that this range is more effective in reducing the particle deposition on the shank and preventing particle deposition of particles within the skirt wall.

Figure 6B:
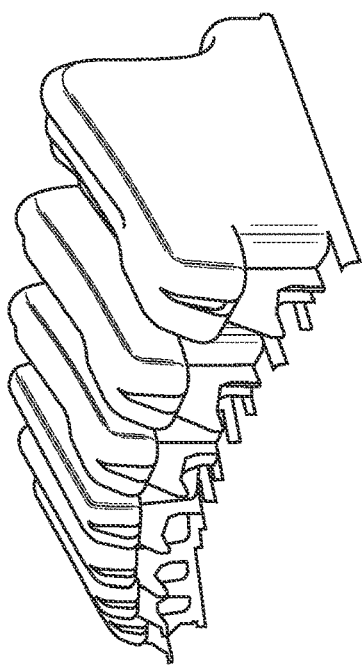
FIG. 6b shows an example of flow field modelling of the air flow through the present disclosure.
Figure 6C:
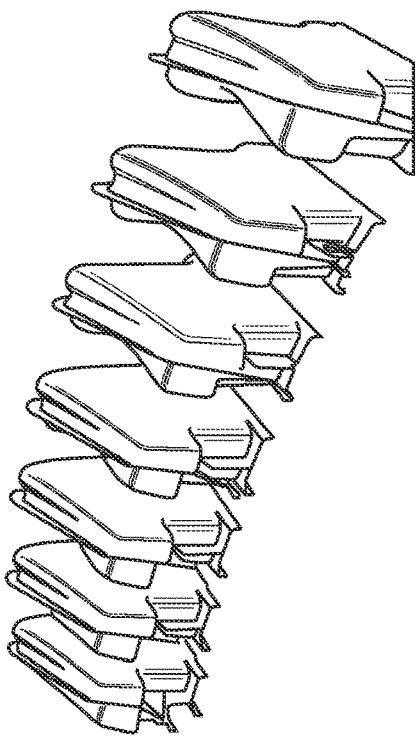
FIG. 6c shows an example of flow field modelling of the air flow through the present disclosure.
Figure 6A:
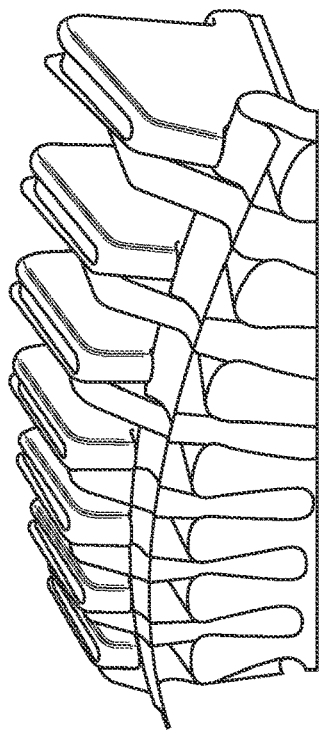
FIG. 6a shows an example of flow field modelling of the air flow through the prior art example of the turbine blades.

The effect of having the different profile of the skirt is shown in FIG. 6 which shows flow field modelling of the different blade designs shown in FIGS. 4 and 5a, 5b. FIG. 6a presents an example showing the modelling of the flow field in the prior art blade configuration presented in FIG. 4. The modelling shows that in the example of the prior art there are areas which constrict the flow of air. This constriction of air allows for particles of sulphur and any sulphur by-products to adhere to the surface of the blade. The presence of these deposits therefore increases the rate of sulfidation of the blade. The figures show the spots or darker areas which represent the modelling of deposition contours on the system. The darker areas representing larger cluster deposits, whereas the smaller points represent either single particles or a small number of clustered particles. FIG. 6b presents the case having the rectangular opening between the adjacent skirts that was presented in FIG. 5a. In this example, it can be seen that the air flow over the surface is faster than that of prior art example. This accelerated airflow acts to remove any accumulated particles from the surface of the turbine blade. Furthermore, this accelerated airflow prevents the accumulation and chance of the any sulphur particles being able to attach to the surface of the turbine blade. The modelling shows that, through this redesign of the skirt, there is a reduction by a third of the flow interaction with the cavity; this also results in a reduced supply of particles into the cavity. FIG. 6c shows the flow field diagram for the skirt having a triangular opening as presented in FIG. 5b. In this modelling the flow enters further into the cavity than the case of the prior art example or that of the rectangular opening between the skirts. This allows the stream of air to remove a greater number of particles that have accumulated further into the cavity from the entry than in the prior art design or that of the rectangular openings. The opening is shown in FIGS. 6b and 6c may is 20% of the opening of the prior art example as shown in FIG. 6a. It has been found beneficial that the opening area is found to beneficial when it is varied between 1-35% of the baseline of the prior art. It has been found to be further beneficial when the range is between 1-20% of the baseline of the opening width. This is beneficial because it is more effective in reducing the shank deposition and reducing the adhesion of particles to the skirt walls.

The design of the skirt portion can be further be changed to allow for increased airflow properties, which assist in preventing the adhesion of particles to the inner cavity space. In FIG. 7a the two skirts 42 on the opposing blades 43 are provided with an elliptical hole 47 which extends through the skirt. An alterative to having the holes in each skirt is to have a hole or cut out which extends across both of the skirts. In FIG. 7b the hole is shown to have an elliptical hole 47 across both the skirts. The area of the hole or holes is found to work best when having an opening area that is between 10-30% of the base line opening. The hole/holes can either have a vertical or horizontal orientation. In both cases the holes can be of any other suitable shape. If using elliptical holes, the major axis should be provided with the major axis in the direction of rotation; this is because the use of an elliptical hole provides for smooth airflow into the aperture or hole. This applies to both the cases of the hole extending across both openings and one provided on each of the skirts. FIG. 7c shows an alternative to the tapered cut out 47 design as shown in FIG. 5b. In this case, the taper is provided so that the taper is provided to extend towards the shank rather than towards the disc. The area of the triangular opening is found to work best when having an opening area that is between 10-30% of the base line opening of the prior art. FIG. 7d provides an alternative in which the skirts do not extend to the shank but have a space 48 between the skirt and the shank. A rectangular cut out 49 may also be provided which extend across both skirt portions on adjacent blades, an example of which is shown in FIG. 7e. This space allows an increase in airflow into the chamber by the inlet of the turbine blade. The provision of the skirt designs reduces the amount of small particle deposition on the blade. This is because the change in shape of the skirt induces a higher velocity of the air flow around the turbine blade. Furthermore, by reducing the size of the opening it can also restrict the entry of large particle into the shank cavity.

Figure 8:
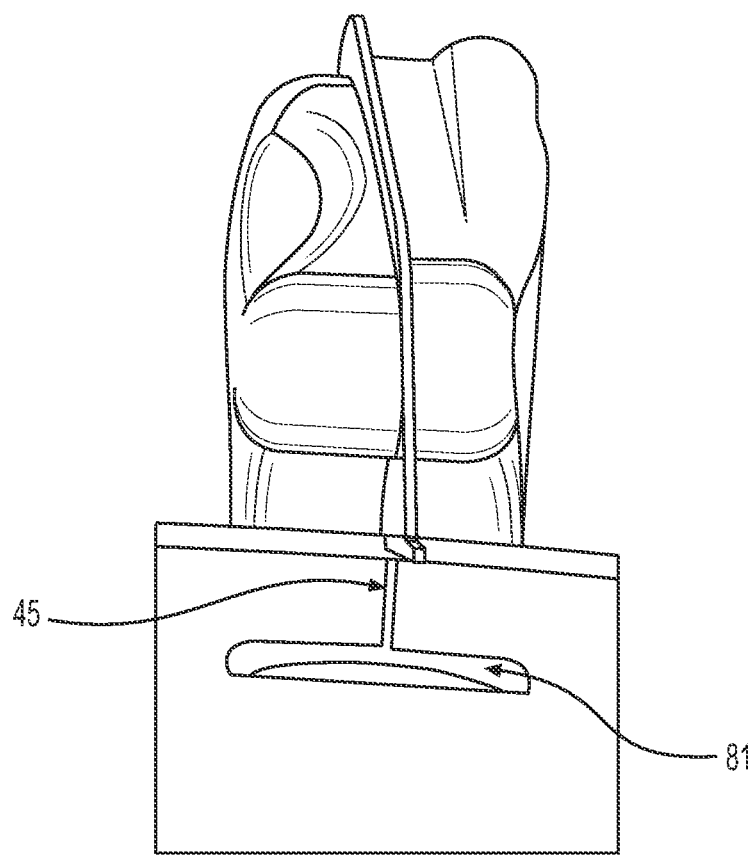
FIG. 8 presents an example of the present disclosure also featuring a gap between the base of the skirt and the top of the disc.

FIG. 8a presents an example of a bladed disc system according to the present disclosure. In this along with the opening between the skirts 45 of the blades there is also a gap present 81, the gap opening extends between the base of the skirt and the top of the disc. This gap between the bottom of the skirt to the top of the disc can be 0.2-0.5 mm. It has the effect of producing airflow into the area around the skirt and thus further reduces the accumulation of particles within the cavity. The presence of the gap is compatible with all the configurations of having an opening of the skirt portions of adjacent blades of between 1-50% of the maximum skirt opening width as presented in FIGS. 5 and 7. The presence of the gap and of the opening in the skirt further help with blade cooling which is crucial with turbine blades.

Figure 9B:
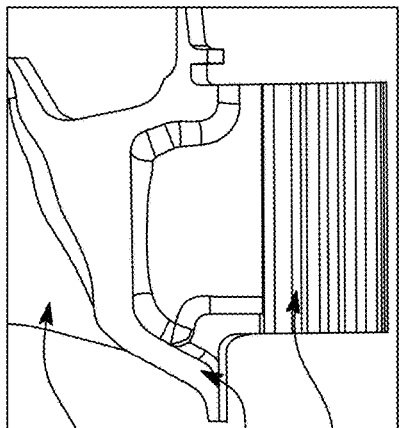
FIG. 9b shows the skirt design having zero hade angle at the rear of the skirt.
Figure 9C:
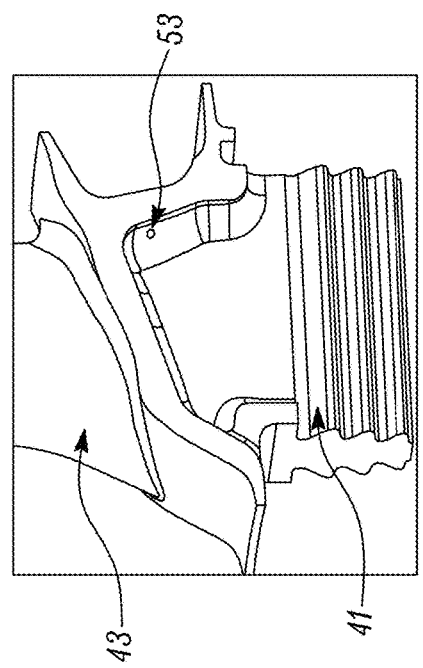
FIG. 9c shows a design of incorporating a vent hole at the rear of the skirt.
Figure 9A:
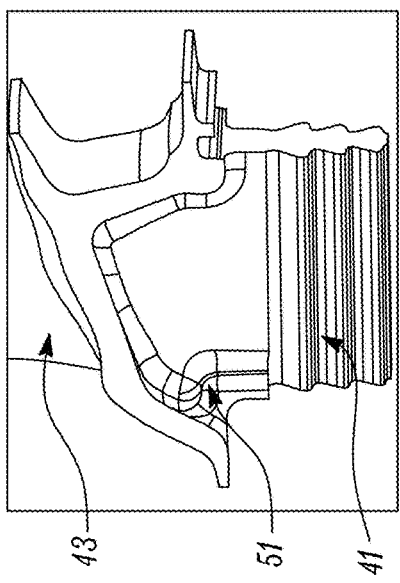
FIG. 9a shows the modification to the design of the skirt design by having a fileted design at the rear of the skirt.

The skirt of the turbine blade of the present disclosure as presented in FIGS. 5a and 5b may be further adapted. The blade 43 and the root portion 41 are the same as in the other figures. The inward facing edges of the skirt may be filleted 51 as shown in FIG. 9a. The filleting is done by blending the edges of the skirt. Modelling shows that by filleting the edges can result in a 10% reduction in the particle deposition on the shank. The effect of this is that it reduces the number of particles that adhere to the inlet of the shank cavity by a third. The blending of the edge of the skirt wall provides a smooth airflow as well as helping the air to accelerate into the cavity; this increased airflow reduces the ability of the sulphur compound particle to adhere within the cavity and thus reduces the effect of sulfidation. The radius of curvature of this fileted section can be 0.1-3 mm. Another alternative is that the skirt may be presented by having zero hade angle 52 as shown in FIG. 9b. The zero hade angle can be achieved through machining of the blade by modifying the inner surface or shank cavity surface. Preferably the zero hade angle is used in combination with a 1-20% width of the maximum opening. The effect of using a zero hade angle edge of the skirt is that there is a large reduction in the number of particles that adhere to the inlet of the shank cavity. Alternatively, or additionally to the above methods of reducing particle adhesion to the inlet of the shank cavity, one or more vent holes 53 can be provided in the shank; this is shown in FIG. 9c. This allows the airflow to be able to escape from the shank inlet. In this the one or more hole is placed on the shank rear end—on the opposing side of the shank to that which the skirt is positioned on. It is preferable that the vent hole is placed at a higher radius. This improves the particles escape and reducing shank deposition. Further, by positioning the vent hole on the convex side provides an improved reduction in deposition than positioning the vent hole on the concave side. The presence of the vent holes within the shank reduces the number of particles that adhere to the inlet cavity of the turbine blade.

By altering the airflow around the shank of the turbine blade it has been found to be possible to reduce the number of particles that can adhere to the blade. This is the effect of increasing the speed of the airflow in the regions where sulphur particles are likely to gather and may cause a problem. By allowing the airflow to flow faster over this region is has been modelled that there is a lesser chance of the particles adhering to the blade. The effect of reducing the number of particles that adhere to in turn reduces the amount of sulphur particles that adhere. The effect of reducing the adhesion of particles is that this can reduce the effects of sulfidation on the particle. The advantage of this is that the lifetime of the component can be increased over that of the prior art. The modifications to the skirt do not affect the aerodynamic performance of the blade, as they lie below the platform and do not affect the main flow path through the turbine blades.

Figure 10A:
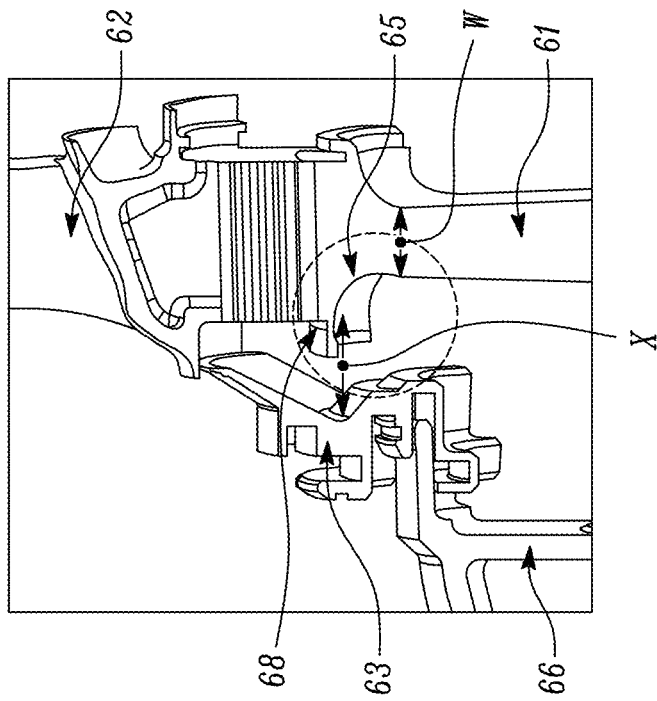
FIG. 10a shows an example of the turbine disc of the prior art.

In addition to or alternative to affecting the airflow around the blade modifications can also be made to the disc. The disc as discussed above is used for mounting the blades. The blade along with connecting the blades is also connected to the shaft at the centre of the disc that drives the fan and compressor. The turbine disc becomes wider at the top to allow for the mounting of the turbine blade. In the prior art the change in width is provided by a chamfered edge that extends between the thinner centre portion of the disc to the wider portion of the disc that is used to support the turbine blade. An example of this prior art solution is shown in FIG. 10a. This figure shows the disc 61 being connected to the blade 62. The disc 61 extends from its connection to a hub which is connected to a drum that is coupled to one of the drive shafts that run through the engine. These shafts are used to drive either a compressor stage or the fan of a gas turbine engine. The turbine blade and disc are linked to an associated stator vane section 66 and has a sealing plate 63 to minimise the loss of combustion air flowing through the turbine stages. The sealing plate and the turbine blade section are not fixedly coupled with the turbine blade and the disc able to rotate relative to the stator section. As this is the case, the sealing is not perfect and as such allows a small amount of airflow to enter into the area containing the disc and the blade roots. It is these regions where issues of accumulation of sulfidation causes issues; this is because to remove the accumulation requires more complex inspection whist the cleaning and removal of the sulfidation requires parts of the engine to be stripped. The figure shows clearly that the chamfer 64 is provided to provide the transition between the thin portion that is connected to the rotor and the thicker region that is used to couple the disc. This wider region is provided to allow for the firtree portion of the disc. This design allows for a strength benefit at the point of the width transition. Due to the shape it causes a change of airflow in this region it has also been found that there is an accumulation of particles around this area.

Figure 10B:
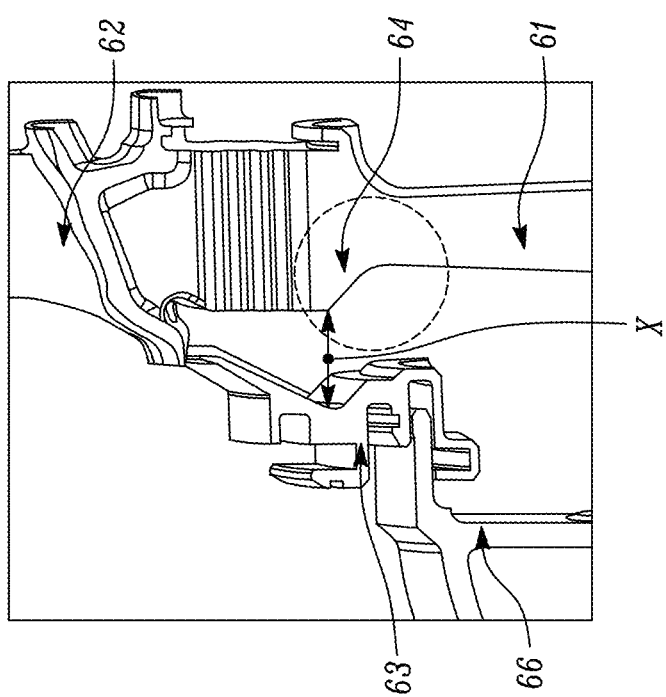
FIG. 10b presents a turbine disc being shaped to attract particles of the present disclosure.

FIG. 10b presents an example of a disc width transition region according to the present disclosure. The disc has a transition region between the narrower middle section of the disc and the part that connects with the blade. In this example the transition 65 is bevelled rather than chamfered. As this transition region is curved it has an associated radius of curvature r. The transition region further features an overhanging section 68, which extends into the space x between the edge of the transition region and the seal region. It has been found that by changing the profile of the transition region affects the airflow. By changing the profile of the transition, the shaping can be designed to increase or reduce the rate of airflow in this transition region. Thus, it has been found that by replacing the chamfer with a bevel allows for a greater number of particles to be retained by the disc. Further the presence of this overhang and this curved transition region act as a getter for the sulphur compound particles and as such cause them to affect areas that are easier to maintain and can make the components last longer. The hub also has width w, which is the width before the broadening in the transition region. The inner section of the curved transition region can be scalloped.

Figure 11B:
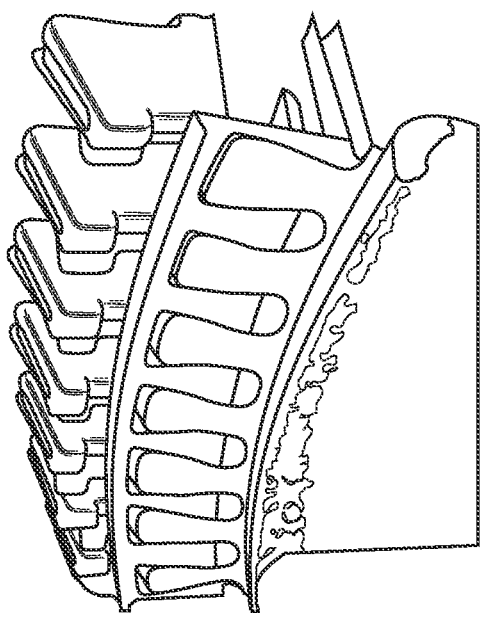
FIG. 11a displays modelling of the particle adhesion to a prior art drum, FIG. 11b displays modelling of the particle adhesion according to the present disclosure having a curved thickness transition region.
Figure 11B:
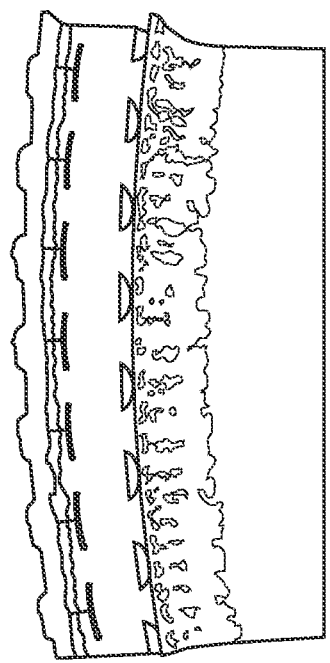
Figure 11A:
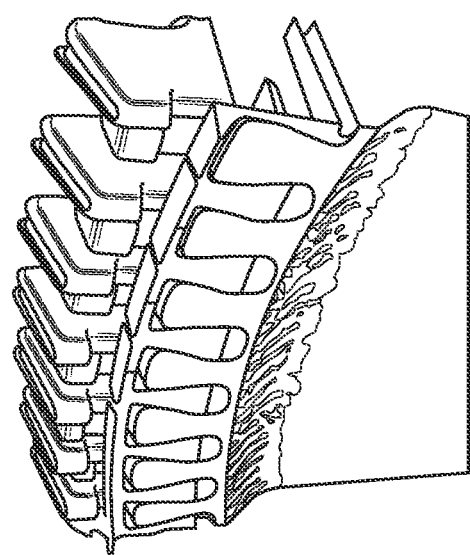
Figure 11A:
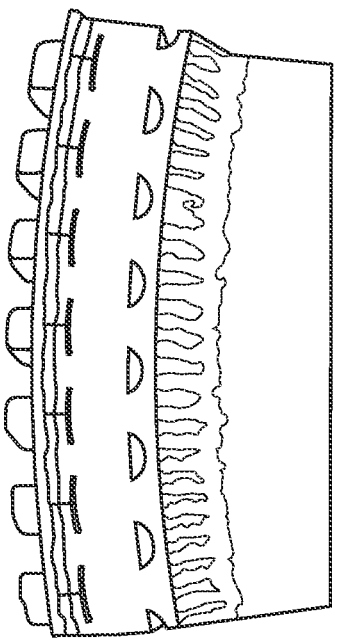

FIG. 11a shows a modelling of particle deposition on the prior art example that was presented in FIG. 10a. In this it can be seen that there is a greater concentration of particle capture in the transition region than on the surrounding disc and blades. There is still however a significant amount of particle capture on the disc hub as well. FIG. 11b shows the modelling of particle deposition on the embodiment presented in FIG. 10b. In this it can be seen that there is significantly greater particle capture in the region around the curved transition region. The effect of this is that there is a reduced number of particles that become attached to the hub on the disc. This transition region is therefore acting as a getter and is disrupting the airflow so that the particles are captured in this region and as such cause a lesser effect on other parts of the bladed disc. Due to the particle being caught in this region means that the cleaning and inspection can be focused on this area and as such potentially reduces the amount of downtime required to resolve the issues of sulfidation on the engine. Furthermore, because the sulfidation particles are trapped at a thicker region potentially results in longer operating life span as any corrosion is limited to regions which already have greater strength.

Figure 12:
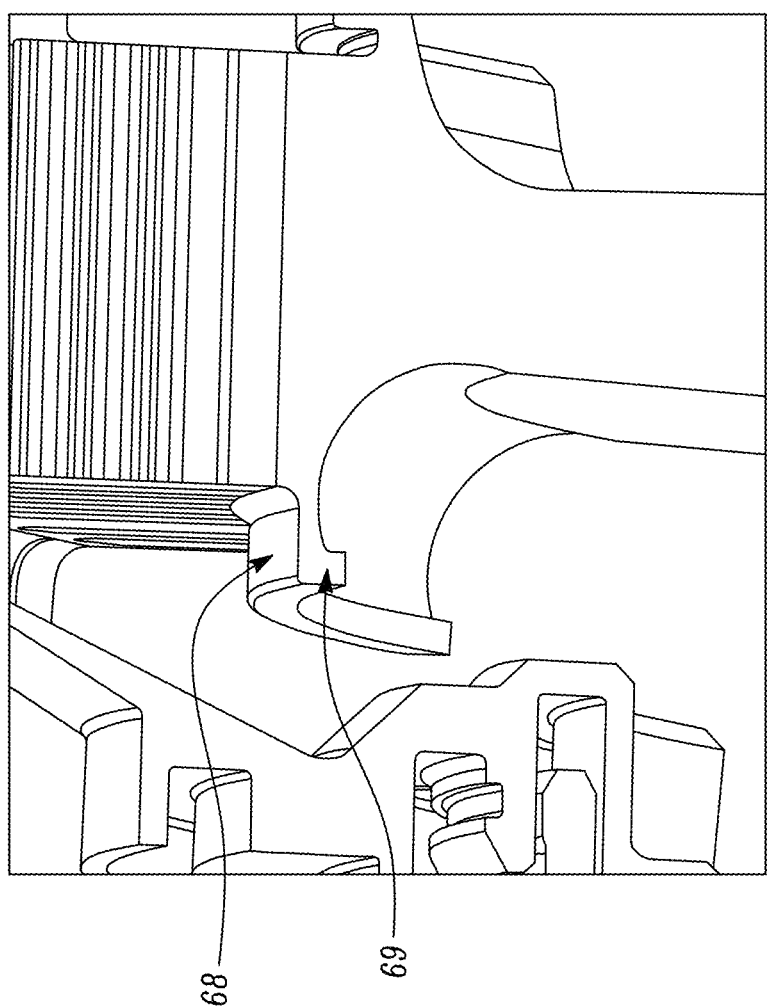
FIG. 12 displays an alternative embodiment according to the present disclosure the overhanging portion having an additional lip.

FIG. 12 presents a further example of the present disclosure. In FIG. 12 the overhang 68 is further provided with a lip/protrusion 69 that extends towards the centre of the blade. The lip or the protrusion may be shaped to be a square or a L-shape. The lip/protrusion may extend between 0.01 and 3.5 mm from the overhang. The effect of the protrusion is to disrupt the airflow in the transition region, thus causing a greater capture of the particles within the transition region.

The overhang portion may extend between 10%-50% of the space between the transition region and the seal arrangement. In particular the overhang may extend between 20%-40% of the space between the transition region and the seal arrangement. The example presented in FIG. 5 the overhang occupies 36% of the space between the transition region and the seal arrangement. The radius of curvature of the of the transition region can be set between 5-15 mm. However, this is dependent upon the size of the disc and hub, as such the radius of curvature of the transition region may have a ratio between the radius r and the width before the transition region w of r/w=0.35-1.1. It has been found to be particularly beneficial if the r/w ratio is between 0.65-0.85.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A bladed disc system for a turbine engine comprising a disk portion and a plurality of blade portions which are associated with a stator section and an intercavity sealing portion,
the disc portion being shaped such that the blade portions are able to fit within firtree slots in the disc portion, each of the blade portions comprising an aerofoil section and a root section, the aerofoil section having a portion shaped such that they extend proximate to the intercavity sealing portion,
the disc portion extending from a portion that connects with a drum to an outer edge at which the blade portions are connected with the disc portion having a width transition region in which a thickness of the disc portion increases from the point at which the disc portion connects to the drum to an outer edge at which the disc portion holds the blade portions,
wherein the width transition region has a curved width transition region with a radius of curvature r, and an overhanging portion which extends into an intercavity spacing between the width transition region and the intercavity sealing portion, and
wherein the radius of curvature r of the width transition region has a ratio with a width of the disc portion at the start of the curvature w before the width transition region with the value of the ratio r/w being between 0.35 and 1.1.

2. The bladed disc system according to claim 1, wherein the overhanging portion also features a protrusion that extends towards a centre of the disc portion.

3. The bladed disc system according to claim 2, wherein the protrusion extends between 0.01 and 3.5 mm from the overhang portion.

4. The bladed disc system according to claim 2, wherein the protrusion is "L" shaped or has a square cross-sectional profile.

5. The bladed disc system according to claim 1, wherein the ratio r/w is between 0.65-0.85.

6. The bladed disc system according to claim 1, wherein the overhanging portion extends between 10%-50% of the space between the width transition region and the intercavity sealing portion.

7. The bladed disc system according to claim 1, wherein the root section comprises a fir tree profile and a skirt portion and wherein skirt portions of adjacent blade portions form an opening that has a maximum separation of between 1-50% of a maximum skirt opening width.

8. The bladed disc system according to claim 7, wherein the skirt portion of adjacent blade portions form a rectangular opening, such that the opening between the adjacent blade portions has parallel edges.

9. The bladed disc system as claimed in claim 7, wherein a rear of the skirt portion is fileted or has zero blade angle.

10. The bladed disc system as claimed in claim 7, wherein a rear of the skirt portion has a hole.

11. A bladed disc system for a turbine engine comprising a disk portion and a plurality of blade portions which are associated with a stator section and an intercavity sealing portion, the disc portion being shaped such that the blade portions are able to fit within firtree slots in the disc portion, each of the blade portions comprising an aerofoil section and a root section, the aerofoil section having a portion shaped such that they extend proximate to the intercavity sealing portion, the disc portion extending from a portion that connects with a drum to an outer edge at which the blade portions are connected with the disc portion having a width transition region in which a thickness of the disc portion increases from the point at which the disc portion connects to the drum to an outer edge at which the disc portion holds the blade portions, wherein the width transition region has a curved width transition region with a radius of curvature r, and an overhanging portion which extends into an intercavity spacing between the width transition region and the intercavity sealing portion, wherein the root section comprises a fir tree profile and a skirt portion and wherein skirt portions of adjacent blade portions form an opening that has a maximum separation of between 1-50% of a maximum skirt opening width, and wherein the skirt portions of adjacent blade portions form a triangular opening, such that the skirt portions of adjacent blade portions taper to the maximum separation.

* * * * *